(12) United States Patent
Ota (10) Patent No.: US 8,629,962 B2
(45) Date of Patent: Jan. 14, 2014

(54) LIQUID CRYSTAL DISPLAY PANEL HAVING PARTICULAR SLIT-SHAPED OPENINGS IN AN UPPER ELECTRODE

(75) Inventor: Akio Ota, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 195 days.

(21) Appl. No.: 13/239,825

(22) Filed: Sep. 22, 2011

(65) Prior Publication Data

US 2012/0008073 A1 Jan. 12, 2012

(30) Foreign Application Priority Data

Mar. 19, 2009 (JP) ................................. 2009-067515

(51) Int. Cl.
*G02F 1/1343* (2006.01)
*G02F 1/1335* (2006.01)

(52) U.S. Cl.
USPC ............................. 349/139; 349/141; 349/109

(58) Field of Classification Search
USPC .......................................... 349/139, 141, 109
See application file for complete search history.

(56) References Cited

U.S. PATENT DOCUMENTS

| | | | | |
|---|---|---|---|---|
| 7,636,142 B2 * | 12/2009 | Aota et al. | ..................... | 349/114 |
| 2004/0150769 A1 | 8/2004 | Tokuda et al. | | |
| 2005/0046775 A1 * | 3/2005 | Lee et al. | ...................... | 349/141 |
| 2007/0008242 A1 | 1/2007 | Mori et al. | | |
| 2010/0128210 A1 | 5/2010 | Mori et al. | | |
| 2011/0187950 A1 * | 8/2011 | Matsushima et al. | ........... | 349/33 |
| 2011/0317110 A1 | 12/2011 | Mori et al. | | |
| 2012/0314150 A1 * | 12/2012 | Sun et al. | ........................ | 349/43 |

FOREIGN PATENT DOCUMENTS

| | | |
|---|---|---|
| JP | 2004-252426 | 9/2004 |
| JP | 2005-70747 | 3/2005 |
| JP | 2005-99455 | 4/2005 |
| JP | 2007-017619 | 1/2007 |
| JP | 2008-065214 | 3/2008 |

OTHER PUBLICATIONS

Japanese Office Action issued Jan. 15, 2013 in a corresponding Japanese Patent Application.

* cited by examiner

*Primary Examiner* — Mike Qi
(74) *Attorney, Agent, or Firm* — K&L Gates LLP (57) ABSTRACT

A liquid crystal display panel includes: first and second substrates facing each other. The first substrate includes a plurality of scanning lines and signal lines intersecting each other, an upper electrode having a plurality of slit-shaped openings formed for each sub-pixel, and a lower electrode. The second substrate includes a light-shielding layer formed so as to overlap the scanning line and a signal line in a plan view, and a color filter layer formed in each of the sub-pixels defined by the scanning lines and the signal lines. A single pixel is formed by the plurality of sub-pixels including the color filter layers of different colors, respectively. The length of the slit-shaped opening in a longitudinal direction in the sub-pixel corresponding to at least one color is shorter than the length of the slit-shaped opening in the longitudinal direction in the sub-pixel corresponding to the other colors.

3 Claims, 7 Drawing Sheets

LIQUID CRYSTAL DISPLAY PANEL HAVING PARTICULAR SLIT-SHAPED OPENINGS IN AN UPPER ELECTRODE

CROSS REFERENCES TO RELATED APPLICATIONS

The present application claims priority to Japanese Priority Patent Application JP 2009-067515 filed in the Japan Patent Office on Mar. 19, 2009, the entire contents of which are hereby incorporated by reference.

BACKGROUND

The present application relates to an FFS mode liquid crystal display panel, and more particularly, to an FFS mode liquid crystal display panel that has sub-pixels of different colors with different transmittances in order to adjust white balance.

Since a liquid crystal display panel has the characteristics of lightness, thinness, and low power consumption compared to a CRT (Cathode-Ray Tube), liquid crystal display panels are used as a display in many electronic apparatuses. In the liquid crystal display panel, the direction of liquid crystal molecules aligned in a predetermined direction is changed by an electric field and the amount of light passing through a liquid crystal layer is changed to display an image. The liquid crystal display panel includes a reflective liquid crystal display panel, in which external light is incident on a liquid crystal layer, is reflected from a reflection plate, passes through the liquid crystal layer again, and exits, a transmissive liquid crystal display panel, in which incident light from a backlight device is transmitted through a liquid crystal layer, and a transflective liquid crystal display panel which has both the reflective and transmissive properties.

A method of applying an electric field to a liquid crystal layer of a liquid crystal display panel includes a vertical electric field method and a lateral electric field method. The liquid crystal display panel of the vertical electric field method mainly applies an electric field of a vertical direction to the liquid crystal molecules from a pair of electrodes disposed with a liquid crystal layer interposed therebetween. As the liquid crystal display panel of the vertical electric field method, there are known a TN (Twisted Nematic) mode liquid crystal display panel, a VA (Vertical Alignment) mode liquid crystal display panel, and an MVA (Multi-domain Vertical Alignment) mode liquid crystal display panel. The liquid crystal display panel of the lateral electric field method, in which a pair of electrodes is disposed on the inside of one of a pair of substrates disposed with a liquid crystal layer interposed therebetween so as to be insulated from each other, mainly applies an electric field of a lateral direction to liquid crystal molecules. As the liquid crystal display panel of the lateral electric field method, there are known an IPS (In-Plane Switching) mode liquid crystal display panel, in which a pair of electrodes does not overlap each other in a plan view, and an FFS (Fringe Field Switching) mode liquid crystal display panel, in which a pair of electrodes overlaps each other. The liquid crystal display panel of the lateral electric field method can obtain a wide view angle. In recent years, a lot of liquid crystal display panels of the lateral electric field method have been used.

Further, a liquid crystal display apparatus includes a monochrome liquid crystal display apparatus and a color liquid crystal display apparatus. For example, the color of a single pixel (one pixel) of the color liquid crystal display apparatus is determined by a mixed color of light passing through the respective sub-pixels that have color filters of the three light primary colors of R (Red), G (Green), and B (Blue), respectively. For example, when a voltage corresponding to 0 gray scales to 255 gray scales of 8 bits is applied to the sub-pixels of R, G, and B, 256 kinds of luminance of each sub-pixel are realized. A lot of colors can be displayed with one pixel by a combination of the luminance of the respective sub-pixels. In a liquid crystal display panel in which one pixel is formed by the sub-pixels of R, G, and B, white display is obtained by turning on or off all of the sub-pixels of R, G, and B.

Chromaticity or luminance balance of the sub-pixels of R, G, and B may collapse due to a formation error of each layer in a liquid crystal display panel, a process difference, or the like. Therefore, even when the voltage of the same gray scale is applied to the sub-pixels of R, G, and B, the white color is not realized, but a yellow color occurs. In order to resolve this problem by a simple configuration, Japanese Unexamined Patent Application Publication No. 2005-99455 discloses a method of adjusting the aperture ratio of at least one of the sub-pixels of R, G, and B so as to be small using a light-shielding layer.

SUMMARY

The liquid crystal display panel disclosed in Japanese Unexamined Patent Application Publication No. 2005-99455 uses a vertical electric field method and includes no upper electrode with a slit-shaped opening that is used in the FFS mode liquid crystal display panel. On the other hand, in the FFS mode liquid crystal display panel, as disclosed in Japanese Unexamined Patent Application Publication No. 2005-70747, there is a reverse twist domain where the rotation direction of the liquid crystal molecules is reversed in the end of the slit-shaped opening. Therefore, the end of the slit-shaped opening is shielded from light by a light-shielding member.

In the end of the slit-shaped opening, however, a ratio of light shield may be varied due to an irregularity in the behavior of the liquid crystal at the driving time or a deviation in position at the assembly time, thereby considerably varying the luminance. For example, the relative position between the slip-shaped opening and the light-shielding layer may be deviated due to, for example, a deviation in the position at which the slip-shaped opening is formed, a deviation in the position at which the light-shielding layer covering a thin film transistor (TFT) serving as a switching element, a scanning line, a signal line, or the like is formed, or a deviation between an array substrate and a color filter substrate when the array substrate, in which the slip-shaped openings are formed, and the color filter substrate, in which the light-shielding layers are formed, are attached.

In the FFS mode liquid crystal display panel, the end of the slit-shaped opening, which is configured to pass through light from a backlight device in the inside of the slit-shaped opening and the part of the upper electrode between the slit-shaped openings, extends to the vicinity of the light-shielding layer or up to the position which overlaps with the light-shielding layer in order to improve the transmittance from a backlight device as much as possible. Therefore, when the relative position between the slit-shaped opening and the light-shielding layer is deviated, the end of the slit-shaped opening may be moved to the inside of a display region.

That is, in the FFS mode liquid crystal display panel, the liquid crystal molecules are driven by an electric field formed between the lower electrode and the upper electrode through the slit-shaped opening formed in the upper electrode. Therefore, in the FFS mode liquid crystal display panel, since the driving direction of the liquid crystal molecules is determined uniquely except for the end of the slit-shaped opening, normal display can be realized. However, since the driving direction of the liquid crystal molecules is not determined uniquely in the end of the slit-shaped opening, the normal display may not be realized. For this reason, when the relative position between the slit-shaped opening and the light-shielding layer is deviated and thus the end of the slit-shaped opening is moved to the inside of the display region, the transmittance may considerably deteriorate, thereby disrupting the white balance.

The present disclosure addresses the above-identified and other problems associated with the FFS mode liquid crystal display panel according to the related art. That is, it is desirable to provide an FFS mode liquid crystal display panel that allows the transmittance of at least a sub-pixel of one color among sub-pixels of a plurality of colors forming a single pixel to be smaller than the transmittance of the sub-pixels of the other colors without depending on a light-shielding layer and appropriately maintains white balance even when a deviation occurs in the relative position between a slit-shaped opening and a light-shielding layer.

According to an embodiment, there is provided a liquid crystal display panel including first and second substrates facing each other with a liquid crystal layer interposed therebetween. The first substrate includes a plurality of scanning lines and signal lines intersecting each other in an insulated state, an upper electrode having a plurality of slit-shaped openings formed for each of sub-pixels defined by the scanning lines and the signal lines, and a lower electrode formed so as to be closer to the first substrate with an insulation layer interposed between the upper and lower electrodes. The second substrate includes a light-shielding layer formed so as to overlap the scanning line and a signal line in a plan view, and a color filter layer formed in each of the sub-pixels defined by the scanning lines and the signal lines. A single pixel is formed by the plurality of sub-pixels including the color filter layers of different colors, respectively. The length of the slit-shaped opening in a longitudinal direction in the sub-pixel corresponding to at least one color is shorter than the length of the slit-shaped opening in the longitudinal direction in the sub-pixel corresponding to the other colors.

The liquid crystal display panel according to the embodiment includes the plurality of scanning lines and the plurality of signal lines intersecting each other in the insulated state, the upper electrode having the plurality of slit-shaped openings formed for each of the sub-pixels defined by the scanning lines and the signal lines, and the lower electrode formed so as to be closer to the first substrate with the insulation layer interposed between the upper and lower electrodes. Accordingly, the liquid crystal display panel according to the embodiment operates in an FFS mode.

In the liquid crystal display panel according to the embodiment, the length of the slit-shaped opening in a longitudinal direction in the sub-pixel (hereinafter, the sub-pixel is referred to as a "white balance adjusting sub-pixel) corresponding to at least one color is shorter than the length of the slit-shaped opening in the longitudinal direction in the sub-pixel corresponding to the other colors in order to adjust the white balance. In the FFS mode liquid crystal display panel, light from a backlight device passes through the inside of the slit-shape opening and the part of the upper electrode between the slit-shaped openings. In the white balance adjusting sub-pixel, the length of the slit-shaped opening in the longitudinal direction is shorter than the length of the slit-shaped opening in the longitudinal direction in the sub-pixels corresponding to the other colors. Therefore, since the area of a portion effectively used for display, that is, the area of a region passing through the light, is reduced, the transmittance of the white balance adjusting sub-pixel is reduced. Accordingly, in the liquid crystal display panel according to the embodiment, it is possible to reduce the transmittance of the white balance adjusting sub-pixel even when the end of the slit-shaped opening is not particularly shielded from the light by a light-shielding member.

In the liquid crystal display panel according to the embodiment, both ends of the slit-shaped opening and the light-shielding layer may not be superimposed on each other in a plan view in the sub-pixel corresponding to at least one color.

With such a configuration, a region where both the ends of the slit-shaped opening and the light-shielding layer are not superimposed on each other in a plan view is formed in the white balance adjusting sub-pixel. Therefore, both the ends of the slit-shaped opening are made not to be covered with the light-shielding layer in a white balance adjusting sub-pixel in the liquid crystal display panel according to the embodiment, even when the relative position between the slit-shaped opening and the light-shielding layer is deviated. Accordingly, the transmittance is rarely varied.

Further, the color filter layer may include red, green, and blue color filter layers and the sub-pixel corresponding to at least one color may be the green sub-pixel.

Since human beings have a high luminous sensitivity for green, a variation in the transmittance of the green sub-pixel is particularly conspicuous. In the liquid crystal display panel according to the embodiment, the green sub-pixel serves as the white balance adjusting sub-pixel. Therefore, even when the relative position between the slit-shaped opening and the light-shielding layer is deviated, the transmittance of the green sub-pixel is rarely varied and thus the deviation in the white balance is not conspicuous. Further, in order to control the white balance with accuracy, anther color sub-pixel such as the blue sub-pixel may serve as the white balance adjusting sub-pixel, as well as the green sub-pixel.

Additional features and advantages are described herein, and will be apparent from the following Detailed Description and the figures.

DETAILED DESCRIPTION

Embodiments of the present application will be described below in detail with reference to the drawings.

Rather, these embodiments are equivalently applicable to various modifications without departing from the technical scope defined in the claims. In order to make description of the specification, respective layers and respective members are shown in different scales so as to be easily recognized throughout the drawings, and thus are not necessarily proportional to those with the actual sizes.

First Embodiment

Figure 1A:
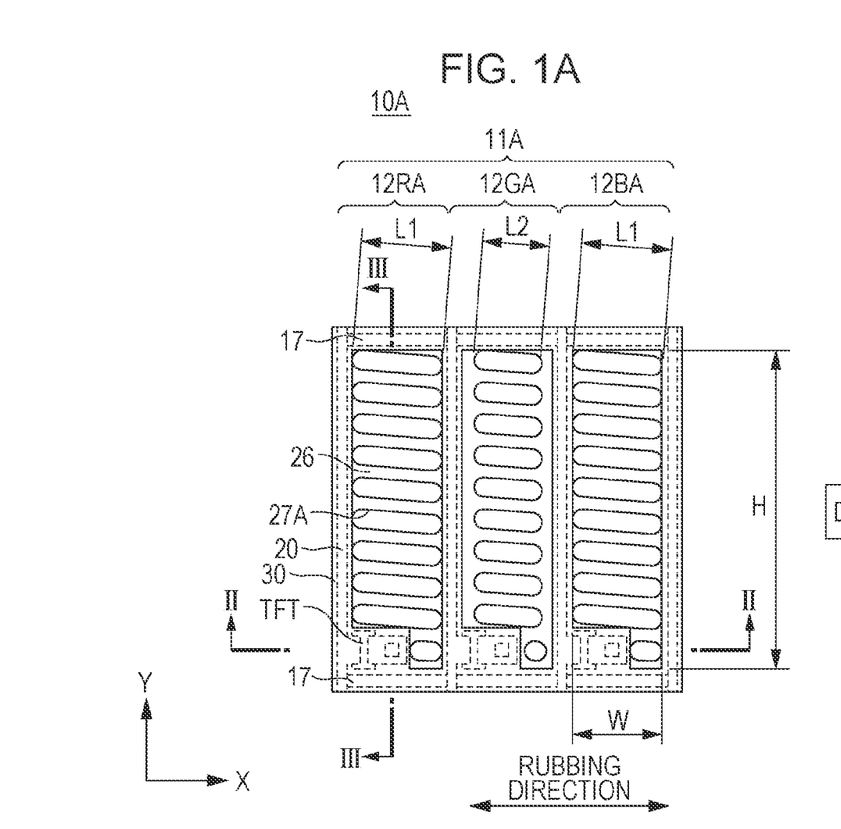
FIG. 1A is a plan view illustrating a single pixel of a liquid crystal display panel according to a first embodiment.
Figure 1B:
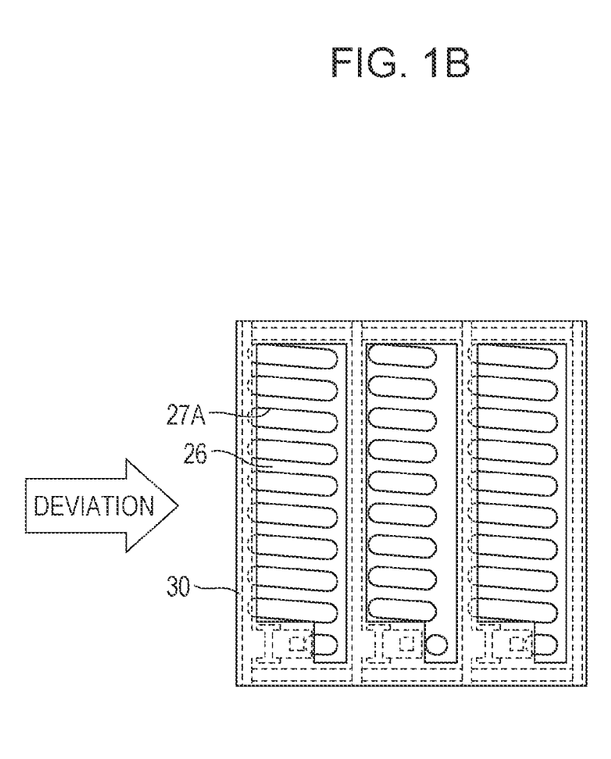
FIG. 1B is a plan view illustrating a state where a relative positional deviation occurs between a slit-shaped opening and a light-shielding layer in FIG. 1A.
Figure 2:
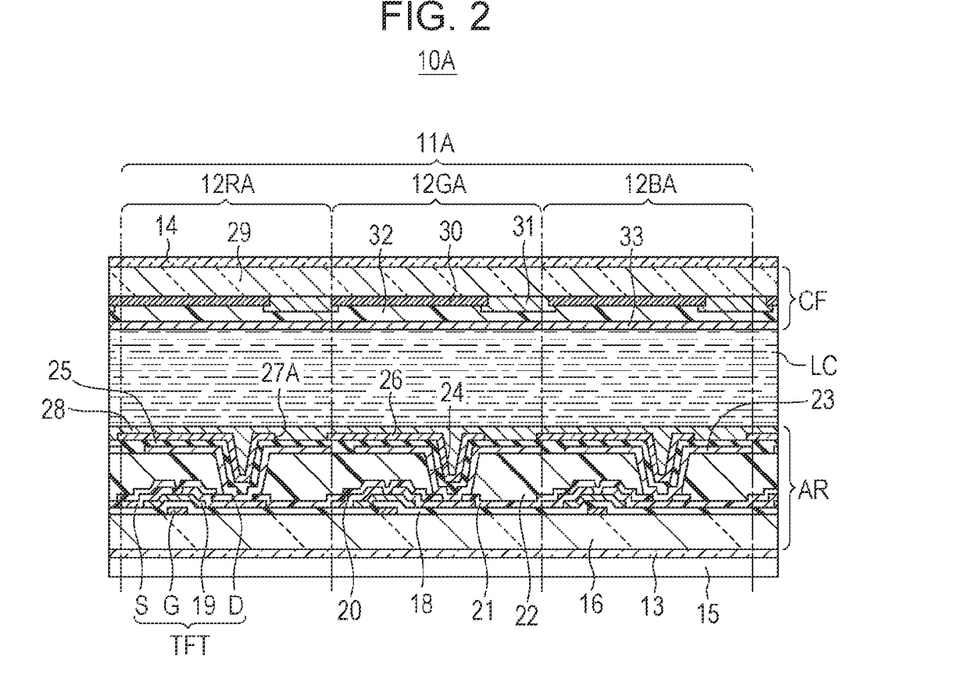
FIG. 2 is a sectional view taken along the line II-II of FIG. 1A.
Figure 3:
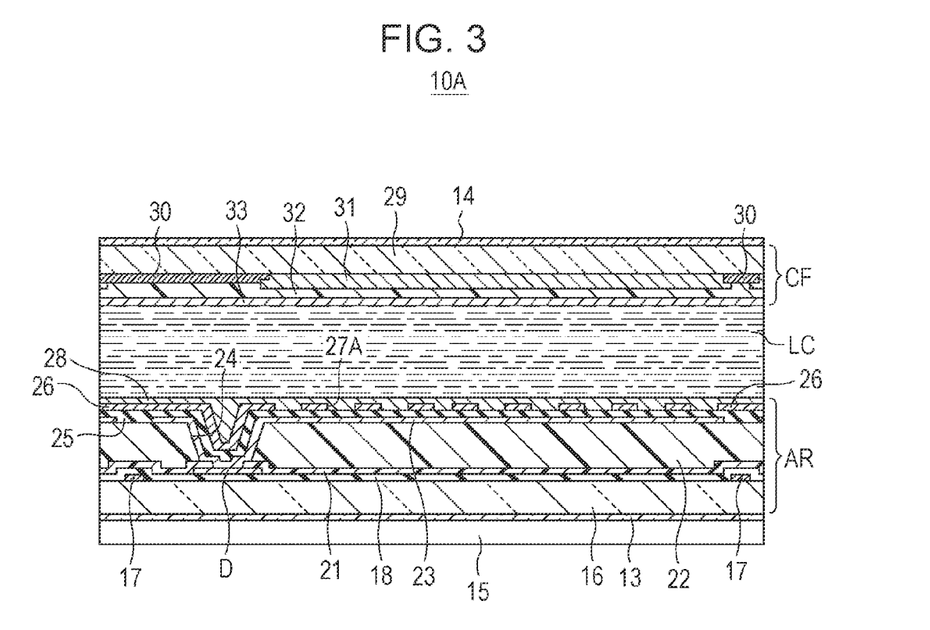
FIG. 3 is a sectional view taken along the line III-III of FIG. 1A.

The configuration of the main units of an FFS mode liquid crystal display panel 10A according to a first embodiment will be described with reference to FIGS. 1A to 3. FIG. 1A is a plan view illustrating a single pixel of the liquid crystal display panel according to the first embodiment. FIG. 1B is a plan view illustrating a state where a relative positional deviation occurs between a slit-shaped opening and a light-shielding layer in FIG. 1A. FIG. 2 is a sectional view taken along the line II-II of FIG. 1A. FIG. 3 is a sectional view taken along the line III-III of FIG. 1A. As shown in FIGS. 1A and 1B, a single pixel 11A of the liquid crystal display panel 10A includes a red sub-pixel 12RA, a green sub-pixel 12GA, and a blue sub-pixel 12BA for the three primary colors of light. The color of the single pixel 11A is determined by a mixed color of the three sub-pixels.

As shown in FIGS. 2 and 3, a first polarized plate 13 is disposed on the rear side of the liquid crystal display panel 10A and a second polarized plate 14 is disposed on the display surface side of the liquid crystal display panel 10A. A backlight device 15 that emits light to the liquid crystal display panel 10A is disposed on the rear side of the first polarized plate 13.

In the liquid crystal display panel 10A, a liquid crystal layer LC is interposed between an array substrate AR and a color filter substrate CF. In the array substrate AR, a first transparent substrate 16 made of glass, quartz, or plastic with a transparent insulation property serves as a base substrate. On the first transparent substrate 16, as shown in FIGS. 1A and 1B, scanning lines 17 made of metal such as aluminum or molybdenum extend in an X axis direction (row direction) in FIGS. 1A and 1B so as to be close to the liquid crystal layer LC. Gate electrodes G formed from the scanning line 17 are formed so as to extend in the left lower portions of the sub-pixels 12RA, 12GA, and 12BA, respectively.

A transparent gate insulation film 18 made of silicon nitride or silicon oxide is laminated so as to cover the scanning lines 17 and the gate electrodes G. A semiconductor layer 19 made of amorphous silicon or polycrystalline silicon is formed on the gate insulation film 18 overlapping with the gate electrode G in a plan view. A plurality of signal lines 20 made of metal such as aluminum or molybdenum is formed on the gate insulation film 18 on the left side of the sub-pixels 12RA, 12GA, and 12BA so as to extend in a Y axis direction (column direction) in FIGS. 1A and 1B. Each source electrode S extends from the signal line 20. Each source electrode S comes into partial contact with the surface of the semiconductor layer 19.

Since the drain electrode D made of the same material as that of the signal line 20 and the source electrode S is formed on the gate insulation film 18, the drain electrode D is disposed so as to be close to the source electrode S and comes into partial contact with the semiconductor layer 19. A region surrounded by the scanning line 17 and the signal line 20 corresponds to a single sub-pixel region. Since a single pixel has a substantially square shape, the sub-pixels 12RA, 12GA, and 12BA formed by dividing the single pixel into three sections each have a rectangular shape in which a short side is adjacent to the scanning line 17 and a long side is adjacent to the signal line 20. The gate electrode G, the gate insulation film 18, the semiconductor layer 19, the source electrode S, and the drain electrode D form a TFT serving as a switching element. The TFT is formed in each of the sub-pixels 12RA, 12GA, and 12BA.

Further, a transparent passivation film 21 made of, for example, silicon nitride or silicon oxide is laminated so as to cover exposed parts of the signal line 20, the TFT, and the gate insulation film 18. A flattened resin film 22 made of a transparent resin material such as photoresist is laminated so as to cover the passivation film 21. A lower electrode 23 made of a transparent conductive material such as ITO (Indium Tin Oxide) or IZO (Indium Zinc Oxide) is formed so as to cover the flattened resin film 22. Since a contact hole 24 is formed so as to penetrate through the flattened resin film 22 and the passivation film 21 and reach the drain electrode D, the lower electrode 23 and the drain electrode D are electrically connected to each other via the contact hole 24. Therefore, the lower electrode 23 herein operates as a pixel electrode.

A transparent inter-electrode insulation film 25 made of, for example, silicon nitride or silicon oxide is laminated so as to cover the lower electrode 23. An upper electrode 26 made of a transparent conductive material such as ITO or IZO is formed so as to cover the inter-electrode insulation film 25. Since the upper electrode 26 of the respective sub-pixels is integrally formed, the upper electrode 26 operates as a common electrode. As shown in FIGS. 1A and 1B, a plurality of slit-shaped openings 27A is formed in the upper electrode 26. The slit-shaped opening 27A has an oval shape and the longitudinal direction is inclined right downward with respect to the extension direction of the scanning line 17 by, for example, 5 degrees. An alignment film 28 made of polyimide is laminated so as to cover the upper electrode 26. The alignment film 28 is subjected to an alignment process (rubbing process) of a liquid crystal direction in a direction parallel to the extension direction of the signal line 20.

In the color filter substrate CF, a second transparent substrate 29 made of glass, quartz, or plastic with a transparent insulation property serves as a base substrate. In the second transparent substrate 29, light-shielding layers 30 and color filter layers 31 passing through light (for example, R, G, and B) of colors different for the respective sub-pixels are formed. As shown in FIGS. 1A and 1B, the light-shielding layer 30 is formed so as to overlap an opaque region of the array substrate AR, that is, the scanning line 17, the signal line 20, the TFT, and the drain electrode D in a plan view. A region where the light-shielding layer 30 of the sub-pixels 12RA, 12GA, and 12BA is not formed is a display region. The color filter layer 31 is formed at the display region.

An overcoat layer 32 made of a transparent resin material such as photoresist is laminated so as to cover the light-shielding layers 30 and the color filter layers 31. The overcoat layer 32 is formed to flatten a step difference caused by the color filter layers 31 of the different colors and prevents impurities flowing out from the light-shielding layers 30 or the color filter layers 31 from entering the liquid crystal layer LC. An alignment film 33 made of, for example, polyimide is formed so as to cover the overcoat layer 32. The alignment film 33 is subjected to an alignment process of a liquid crystal direction in a direction reverse to the direction of the alignment film 28.

The liquid crystal display panel 10A according to the first embodiment can be obtained by facing the array substrate AR and the color filter substrate CF formed in this way toward each other, forming seal members (not shown) in the circumferences of both the substrates, and attaching both the substrates to combine both the substrate, and filling liquid crystal between both the substrates. A spacer (not shown) that maintains the liquid crystal layer LC with a predetermined thickness is formed in the color filter substrate CF.

With such a configuration, when the TFTs are turned on and thus a voltage is applied between the lower electrodes 23 and the upper electrode 26, an electric field is generated between both the electrodes 23 and 26 and thus the alignment of the liquid crystal molecules of the liquid crystal layer LC is varied. Thus, the optical transmittance of the liquid crystal layer LC is varied to display an image. An auxiliary capacitor is formed by the lower electrode 23, the upper electrode 26, and the inter-electrode insulation film 25. Therefore, when the TFTs are turned off, the electric field between both the electrodes 23 and 26 is maintained for a predetermined time.

When the voltage corresponding to, for example, 8-bit gray scales (0 gray scales to 255 gray scales) is applied to the red sub-pixel 12RA, the green sub-pixel 12GA, and the blue sub-pixel 12BA, it is possible to display 256 kinds of densities. According to the design, all of the sub-pixels 12RA, 12GA, and 12BA simultaneously have the same gray scale, a white color is displayed. In the liquid crystal display panel 10A according to the first embodiment, however, chromaticity or luminance balance of R, G, and B may collapse due to a behavior difference, a process difference, or the like between the liquid crystal molecules in the liquid crystal display panel 10A. Therefore, even when the voltage of the same gray scale is applied to all of the sub-pixels 12RA, 12GA, and 12BA, the sub-pixels may not display a complete whole color, but may display a yellow color.

For this reason, in the liquid crystal display panel 10A according to the first embodiment, the green sub-pixel 12GA serves as a white balance adjusting sub-pixel as shown in FIGS. 1A and 1B. The length L2 of the slit-shaped opening 27A in the longitudinal direction is shorter than the length L1 of the slit-shaped opening 27A of the red sub-pixel 12RA and the blue sub-pixel 12BA in the longitudinal direction. In this case, the light-shielding layers 30 includes a signal line overlap region which overlaps with the signal line 20 in a plan view and a scanning line overlap region that overlaps the scanning line 17 in a plan view. The distances W between the signal line overlap regions adjacent to each other and the distances H between the scanning line overlap regions are the same as each other in all of the sub-pixels. In the FFS mode liquid crystal display panel, the liquid crystal molecules between the slip-shaped opening 27A and the upper electrode 26 between the slip-shaped openings 27A are driven by the electric field formed between the lower electrodes and the upper electrode. Accordingly, in the FFS mode liquid crystal display panel 10A according to the first embodiment, light from the backlight passes through in a part of the slip-shape opening 27A and the upper electrode 26 between the slip-shaped openings 27A.

As shown in FIG. 1A, when the length of the slip-shaped opening 27A of the green sub-pixel 12GA serving as the white balance adjusting sub-pixel is shortened, an electric field generation region where the liquid crystal is driven is narrowed and thus the transmittance of the green sub-pixel 12GA becomes lower than the transmittances of the red sub-pixel 12RA and the blue sub-pixel 12BA. Accordingly, in the liquid crystal display panel 10A according to the first embodiment, it is possible to adjust the white balance by reducing the transmittance of at least one sub-pixel of the R, G, and B sub-pixels without shielding the upper electrode 26 and the slit-shaped openings 27A by the light-shielding layer that covers the TFTs, the scanning lines, the signal lines, or the like, as in a liquid crystal display panel disclosed in Japanese Unexamined Patent Application Publication No. 2005-99455.

Further, the relative position between the slip-shaped opening 27A and the light-shielding layer 30 may be deviated due to, for example, a deviation in the position of an exposure mask at the time of forming the slip-shaped openings 27A, a deviation in the position of an exposure mask at the time of forming the light-shielding layer 30 that covers the scanning lines 17, the signal lines 20, or the like, or a deviation between the array substrate AR and the color filter substrate CF when the array substrate AR, in which the slip-shaped openings 27A are formed, and the color filter substrate CF, in which the light-shielding layers 30 are formed, are attached. In the FFS mode liquid crystal display panel 10A, as in the red sub-pixel 12RA and the blue sub-pixel 12BA shown in FIG. 1A, the slip-shaped openings 27A extend to the vicinity of the light-shielding layers 30 or up to the positions which overlap the light-shielding layers 30 in order to improve the transmittance as much as possible.

Therefore, when the relative position between each slip-shaped opening 27A and each light-shielding layer 30 is deviated in the longitudinal direction of the slip-shaped opening 27A, one end of the slip-shaped opening 27A may be moved to the side of the display region. The deviated state is shown in FIG. 1B. As shown in FIG. 1B, the color filter substrate CF is deviated on the right side from the state shown in FIG. 1A and one set of ends of the slip-shaped openings 27A of the red sub-pixel 12RA and the blue sub-pixel 12BA are moved to the side of the display region. In this deviated state, the transmittances of each red sub-pixel 12RA and each blue sub-pixel 12BA may deteriorate.

However, the length of the slip-shaped openings 27A of the green sub-pixel 12GA is short. Therefore, the ends of the slip-shaped openings 27A are not covered by the light-shielding layers 30, even when the relative position between the slip-shaped openings 27A and the light-shielding layers 30 is deviated in the longitudinal direction of the slip-shaped openings 27A, as in FIG. 1B. Accordingly, in the green sub-pixel 12GA, the transmittance is not easily reduced even when the relative position between the slip-shaped openings 27A and the light-shielding layers 30 is deviated in the longitudinal direction of the slip-shaped openings 27A. Since human beings have a luminous sensitivity that is lower in respect to red and blue than to green, the deterioration in the transmittances of the red sub-pixel 12RA and the blue sub-pixel 12BA is not conspicuous and the disruption of the white balance is not actually felt.

Modifications of First Embodiment

Figure 4A:
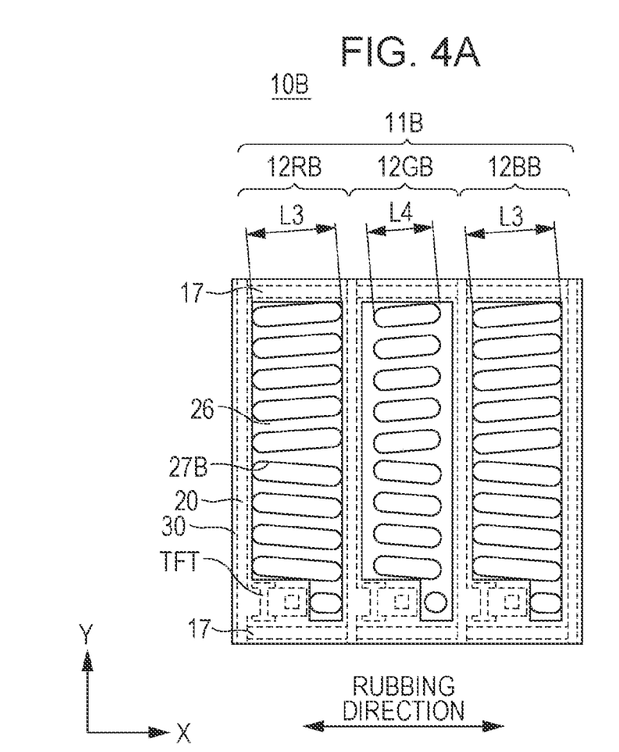
FIG. 4A is a plan view illustrating a single pixel of a liquid crystal display panel according to a modification of the first embodiment.
Figure 4B:
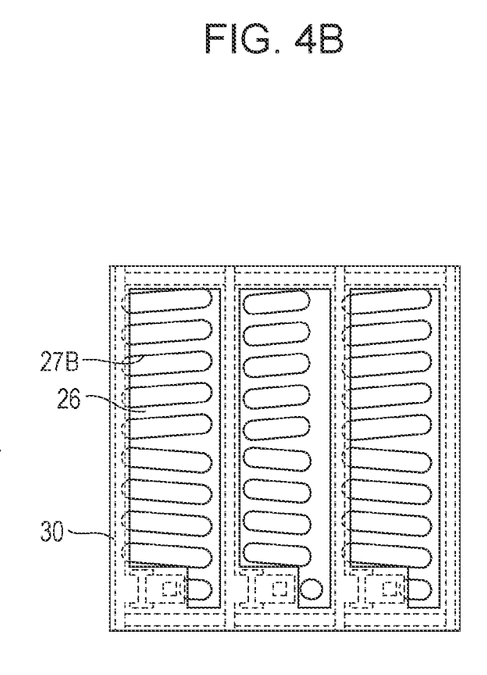
FIG. 4B is a plan view illustrating a state where a relative positional deviation occurs between a slit-shaped opening and a light-shielding layer in FIG. 4A.

In the liquid crystal display panel 10A according to the first embodiment, the case has been described in which the extension direction of the slip-shaped openings 27A is inclined with respect to only one direction, that is, the direction of the rubbing process. However, the embodiment is applicable to a liquid crystal display panel 10B of a so-called dual domain type that has a region where the slip-shaped openings are inclined upward to the right side and a region where the slip-shaped openings are inclined downward to the right side. A modification of the liquid crystal display panel 10A according to the first embodiment is shown in FIGS. 4A and 4B. FIG. 4A is a plan view illustrating a single pixel. FIG. 4B is a plan view illustrating a deviation in the relative position between the slip-shaped openings and the light-shielding layers in FIG. 4A.

The liquid crystal display panel 10B according to the modification of the first embodiment is different only in respect to respect to the shape and disposition of slip-shaped openings 27B of a white balance adjusting sub-pixel from the liquid crystal display panel 10A according to the first embodiment. In FIGS. 4A and 4B, the same reference numerals are given to the same constituent elements as those of the liquid crystal display panel 10A according to the first embodiment, and the detailed description thereof will not be repeated. In the liquid crystal display panel 10B of the dual domain type, it is also possible to obtain the same operational advantages as those of the liquid crystal display panel 10A according to the first embodiment, by allowing the length L4 of the slip-shaped openings 27B in the longitudinal direction in a green sub-pixel 12 GB, which serves as the white balance adjusting sub-pixel, to be shorter than the length L3 of the slip-shaped openings 27B of a red sub-pixel 12RB and a blue sub-pixel 12BB in the longitudinal direction.

Second Embodiment

Figure 5A:
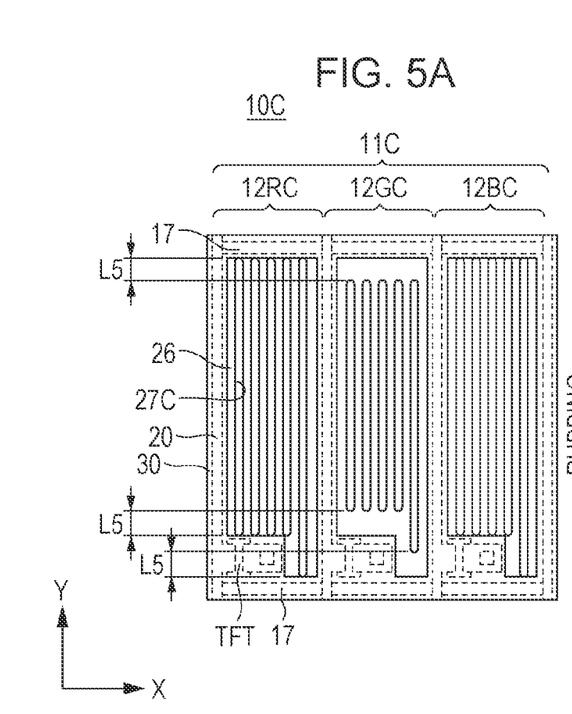
FIG. 5A is a plan view illustrating a single pixel of a liquid crystal display panel according to a second embodiment.
Figure 5B:
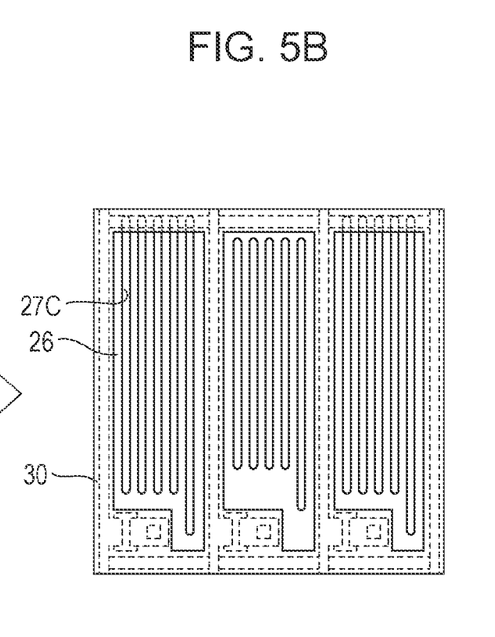
FIG. 5B is a plan view illustrating a state where a relative positional deviation occurs between a slit-shaped opening and a light-shielding layer in FIG. 5A.

A liquid crystal display panel 10C according to a second embodiment will be described with reference to FIGS. 5A and 5B. FIG. 5A is a plan view illustrating a single pixel. FIG. 5B is a plan view illustrating a deviation in the relative position between the slit-shaped openings and the light-shielding layers in FIG. 5A. The liquid crystal display panel 10C according to the second embodiment is different only in respect to the shape and disposition of the slit-shaped openings 27C serving as the white balance adjusting sub-pixel from the liquid crystal display panel 10A according to the first embodiment. In FIGS. 5A and 5B, the same reference numerals are given to the same constituent elements as those of the liquid crystal display panel 10A according to the first embodiment, and the detailed description thereof will not be repeated.

In the liquid crystal display panel 10C according to the second embodiment, the extension direction of the slip-shaped openings 27C is the Y axis direction (column direction), like the extension direction of the signal lines 20. Since a single pixel 11C has a substantially square shape, the sub-pixels 12RC, 12GC, and 12BC have a vertically long shape. Accordingly, in the liquid crystal display panel 10C according to the second embodiment, the number of ends of the slip-shaped openings 27C is small and a reverse twist domain in the ends is small compared to the liquid crystal display panel 10A according to the first embodiment. Therefore, the advantage of improving transmittance is obtained. In the liquid crystal display panel 10C according to the second embodiment, the length of the slip-shaped openings 27C in the longitudinal direction in the green sub-pixel 12GC serving as the white balance adjusting sub-pixel is shorter by L5 than the length of the slip-shaped openings in the longitudinal direction in the red sub-pixel 12RA and the blue sub-pixel 12BA.

Accordingly, as in the liquid crystal display panel 10A according to the first embodiment, since a region where the electric field driving the liquid crystal is generated becomes small in the green sub-pixel 12GC, the transmittance of the green sub-pixel 12GC is lower than the transmittances of the red sub-pixel 12RC and the blue sub-pixel 12BC. In the liquid crystal display panel 10C according to the second embodiment, as shown in FIG. 5B, the relative position between the slip-shaped openings 27C and the light-shielding layers 30 is deviated in the longitudinal direction of the slip-shaped openings 27C and the length of the slip-shaped openings 27C in the longitudinal direction in the green sub-pixel 12GC is shorter. Therefore, the ends of the slip-shaped openings 27C are not covered with the light-shielding layers 30. Accordingly, in the green sub-pixel 12GC serving as the white balance adjusting sub-pixel, the transmittance is not easily reduced even when the relative position between the slip-shaped openings 27C and the light-shielding layers 30 is deviated in the longitudinal direction of the slip-shaped openings 27C.

Modifications of Second Embodiment

Figure 6A:
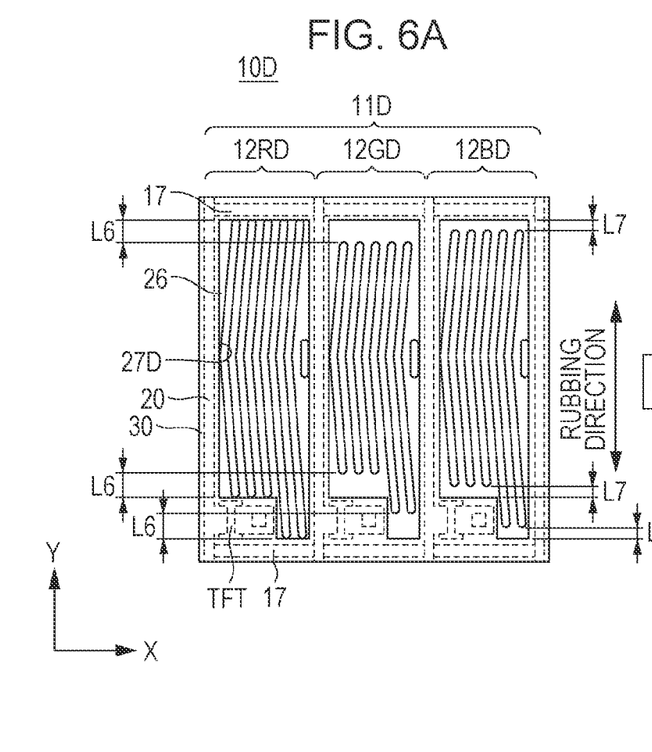
FIG. 6A is a plan view illustrating a single pixel of a liquid crystal display panel according to a modification of the second embodiment.
Figure 6B:
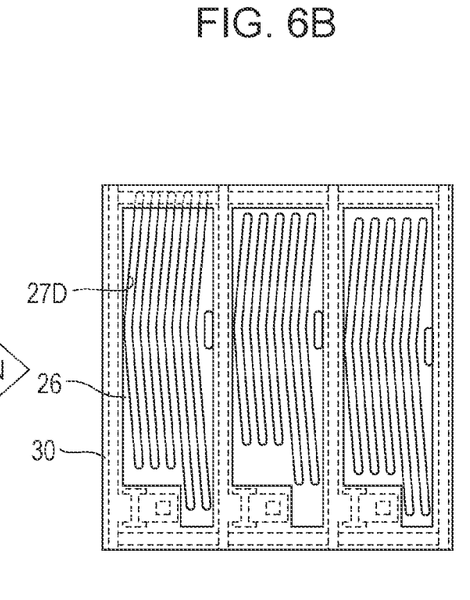
FIG. 6B is a plan view illustrating a state where a relative positional deviation occurs between a slit-shaped opening and a light-shielding layer in FIG. 6A.

In the liquid crystal display panel 10C according to the second embodiment, the case has been described in which the extension direction of the slip-shaped openings 27C is oriented along the signal line. A liquid crystal display panel 10D according to a modification of the second embodiment has a dual domain type as in the liquid crystal display panel 10C according to the second embodiment. The modification of the liquid crystal display panel 10C according to the second embodiment is shown in FIGS. 6A and 6B. FIG. 6A is a plan view illustrating a single pixel. FIG. 6B is a plan view illustrating a deviation in the relative position between the slip-shaped openings and the light-shielding layers in FIG. 6A.

The liquid crystal display panel 10D according to the modification of the second embodiment is different only in respect to the shape and disposition of slip-shaped openings 27D of a white balance adjusting sub-pixel from the liquid crystal display panel 10C according to the second embodiment. In FIGS. 6A and 6B, the same reference numerals are given to the same constituent elements as those of the liquid crystal display panel 10C according to the second embodiment, and the detailed description thereof will not be repeated.

In the liquid crystal display panel 10D of the dual domain type according to the modification of the second embodiment, a green sub-pixel 12GD and a blue sub-pixel 12BD serve as a white balance adjusting sub-pixels in order to control the white balance with accuracy. Further, the length of the slip-shaped openings 27D in the longitudinal direction in the green sub-pixel 12GD is shorter by L6 than the length of the slip-shaped opening 27D in the longitudinal direction in the red sub-pixel 12RD. The length of the slip-shaped openings 27D in the longitudinal direction in the blue sub-pixel 12BD is shorter by L7 than the length of the slip-shaped opening 27D in the longitudinal direction in the red sub-pixel 12RD. Even in the liquid crystal display panel 10D with such a configuration, the same advantages as those of the liquid crystal display panel 10C according to the second embodiment or greater advantages can be obtained. In particular, when accurate white balance is not necessary, the length of the slip-shaped openings 27D in the longitudinal direction in the blue sub-pixel 12BD may be the same as the length of the slip-shaped openings 27D in the longitudinal direction in the red sub-pixel 12RD.

COMPARISON EXAMPLE

Figure 7A:
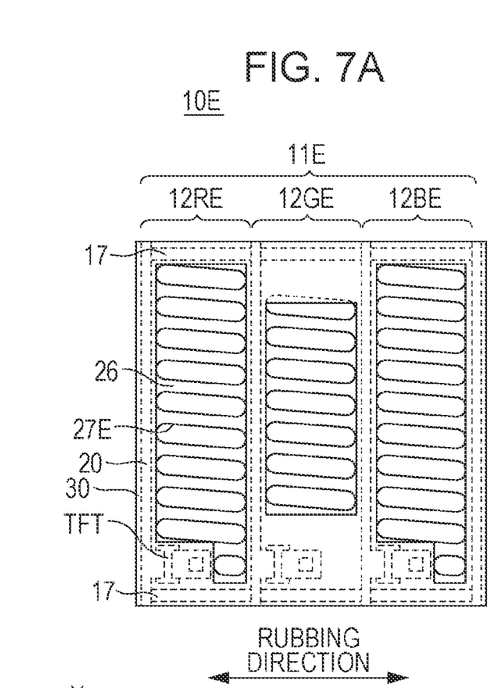
FIG. 7A is a plan view illustrating a single pixel of a liquid crystal display panel according to a comparison example.
Figure 7B:
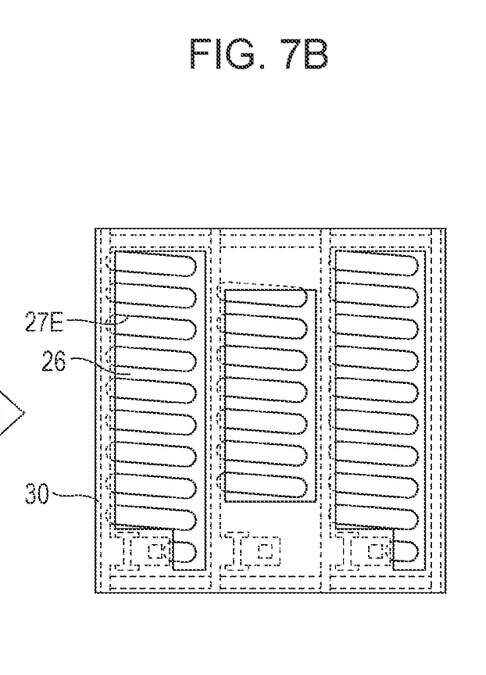
FIG. 7B is a plan view illustrating a state where a relative positional deviation between a slit-shaped opening and a light-shielding layer in FIG. 7A.

In order to confirm the operational advantages of the liquid crystal display panel according to the embodiments, a liquid crystal display panel 10E according to a comparison example in which the white balance adjusting method disclosed in Japanese Unexamined Patent Application Publication No. 2005-99455 is applied to the FFS mode liquid crystal display panel will be described with reference to FIGS. 7A and 7B according to a comparison example. FIG. 7A is a plan view illustrating a single pixel. FIG. 7B is a plan view illustrating a deviation in the relative position between the slip-shaped openings and the light-shielding layers in FIG. 7A. The liquid crystal display panel 10E according to the comparison example has substantially the same configuration as that of the liquid crystal display panel 10A according to the first embodiment except for the configuration of a light-shielding layer 30E. Accordingly, in FIGS. 7A and 7B, the same reference numerals are given to the same constituent elements as those of the liquid crystal display panel 10A according to the first embodiment, and the detailed description thereof will not be repeated.

In the liquid crystal display panel 10E according to the comparison example, as shown in FIG. 7A, a red sub-pixel 12RE, a green sub-pixel 12GE, and a blue sub-pixel 12BE are the same as each other in the shape and disposition of the slip-shaped openings 27E. The shape and disposition of the light-shielding layer 30E in the red sub-pixel 12RE and the blue sub-pixel 12BE are the same as those of the liquid crystal display panel 10A according to the first embodiment. However, the transmittance is made to be lowered by shielding the upper electrode 26 and the slip-shaped openings 27E from light in the green sub-pixel 12GE, which serves as the white balance adjusting sub-pixel, much more than in the red sub-pixel 12RE and the blue sub-pixel 12BE. In this way, the white balance is adjusted.

In this case, when the relative position between the slit-shaped opening 27E and the light-shielding layer 30E is deviated in the longitudinal direction of the slit-shaped opening 27E and one end of the slit-shaped opening 27E is moved to the side of the display region, the transmittances of all the red sub-pixel 12RE, the green sub-pixel 12GE, and the blue sub-pixel 12BE may deteriorate. At this time, the transmittances of the red sub-pixel 12RE and the blue sub-pixel 12BE deteriorate to the same extent. However, since the area of the original display region is small in the green sub-pixel 12GE serving as the white balance adjusting sub-pixel, the deterioration ratio of the transmittance in the green sub-pixel 12GE may be larger than the deterioration ratios of the transmittances in the red sub-pixel 12RE and the blue sub-pixel 12BE. For this reason, the white balance in the liquid crystal display panel 10E according to the comparison example may be disrupted more than in the liquid crystal display panel 10A according to the first embodiment, when the relative position between each slip-shaped opening 27E and each light-shielding layer 30E is deviated.

In the liquid crystal display panels according to the embodiments, as described above, it is possible to maintain the white balance uniformly, compared to the case where the white balance adjusting method is adopted, as disclosed in Japanese Unexamined Patent Application Publication No. 2005-99455, even when the relative position between each slit-shaped opening and each light-shielding layer is deviated. In the embodiments and the modifications described above, the lower electrode serves as a pixel electrode and the upper electrode serves as a common electrode. However, the lower electrode may serve as a common electrode and the upper electrode may serve as a pixel electrode. Further, in the embodiments and the modifications described above, the lower electrodes are formed on the flattened resin film 22. However, the embodiments are applicable to an FFS mode liquid crystal display panel in which no flattened resin film 22 may be formed and the lower electrodes may be formed on the surface of the first transparent substrate.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display panel comprising:
    first and second substrates facing each other with a liquid crystal layer interposed therebetween,
    wherein the first substrate includes
        a plurality of scanning lines and signal lines intersecting each other in an insulated state,
        an upper electrode having a plurality of slit-shaped openings formed for each of sub-pixels defined by the scanning lines and the signal lines, and
        a lower electrode formed so as to be closer to the first substrate with an insulation layer interposed between the upper and lower electrodes,
    wherein the second substrate includes
        a light-shielding layer formed so as to overlap the scanning line and a signal line in a plan view, and
        a color filter layer formed in each of the sub-pixels defined by the scanning lines and the signal lines,
    wherein a single pixel is formed by the plurality of sub-pixels including the color filter layers of different colors, respectively, and
    wherein the length of the slit-shaped opening in a longitudinal direction in the sub-pixel corresponding to at least one color is shorter than the length of the slit-shaped opening in the longitudinal direction in the sub-pixel corresponding to the other colors.

2. The liquid crystal display panel according to claim 1, wherein in the sub-pixel corresponding to at least one color, both ends of the slit-shaped opening and the light-shielding layer do not superimpose each other in a plan view.

3. The liquid crystal display panel according to claim 1, wherein the color filter layer includes red, green, and blue color filter layers and the sub-pixel corresponding to at least one color is the green sub-pixel.

* * * * *